United States Patent [19]
Fergeson et al.

[11] Patent Number: 5,208,809
[45] Date of Patent: May 4, 1993

[54] COMMUNICATION NETWORK NODE

[75] Inventors: Allen D. Fergeson, Johnstown; James A. Uetrecht, Pickerington, both of Ohio

[73] Assignee: AT&T Bell Laboratories, Murray Hill, N.J.

[21] Appl. No.: 844,917

[22] Filed: Mar. 5, 1992

Related U.S. Application Data

[63] Continuation of Ser. No. 537,739, Jun. 14, 1990, abandoned.

[51] Int. Cl.$^5$ .............................. H04J 3/00; H04J 1/16
[52] U.S. Cl. ..................................... 370/91; 370/85.12
[58] Field of Search ............. 870/103, 108, 91, 85.11, 870/85.15, 17, 16, 85.12, 92, 93, 48, 44, 8, 10, 11; 340/825.05; 375/118, 109; 370/112, 60; 345/425

[56] References Cited

U.S. PATENT DOCUMENTS

| | | | |
|---|---|---|---|
| 4,158,232 | 6/1979 | Call et al. ............................ | 395/425 |
| 4,353,128 | 10/1982 | Cummiskey ........................... | 370/91 |
| 4,390,969 | 6/1983 | Hayes .................................... | 370/60 |
| 4,413,338 | 11/1983 | Renoulin et al. ................... | 370/85.15 |
| 4,528,661 | 7/1985 | Bahr et al. ........................ | 370/85.15 |
| 4,547,880 | 10/1985 | De Vita et al. ...................... | 370/91 |
| 4,554,659 | 11/1985 | Blood et al. ...................... | 370/85.12 |
| 4,589,106 | 5/1986 | Prather et al. ........................ | 370/91 |
| 4,633,489 | 12/1986 | Morishita ............................. | 370/91 |
| 4,663,706 | 5/1987 | Allen et al. ......................... | 395/200 |
| 4,683,563 | 7/1987 | Rouse et al. ......................... | 370/16 |
| 4,805,194 | 2/1989 | Wesolowski ......................... | 370/91 |
| 4,855,998 | 8/1989 | Kishimoto ....................... | 370/85.15 |
| 4,860,284 | 8/1989 | Brown et al. .................... | 370/85.15 |
| 4,931,986 | 6/1990 | Daniel et al. ........................ | 375/118 |
| 4,987,572 | 1/1991 | Scott .................................... | 370/91 |

Primary Examiner—Douglas W. Olms
Assistant Examiner—Dang Ton
Attorney, Agent, or Firm—Dwight A. Marshall

[57] ABSTRACT

A node for use with asynchronous and synchronous communication networks to interconnect data systems with networks having transmission paths interconnecting network nodes. Apparatus interconnects pulse controlled components of the node with network transmission paths and synchronizes a flow of data incoming to and outgoing from the node on the network transmission paths within the node at an unsynchronized clock pulse rate independent of the data transfer rate on the transmission paths and independent of a master network clock.

21 Claims, 6 Drawing Sheets

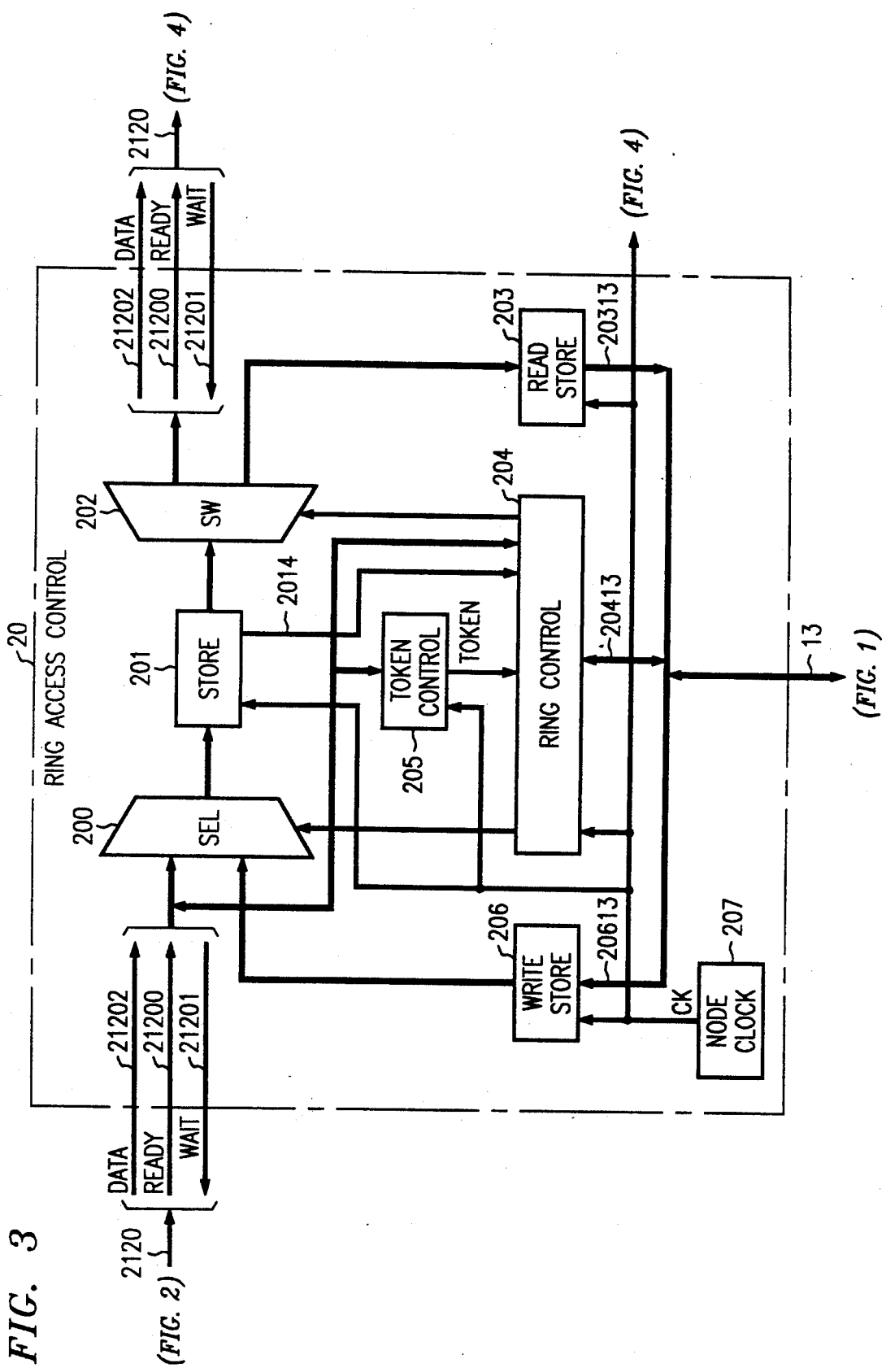

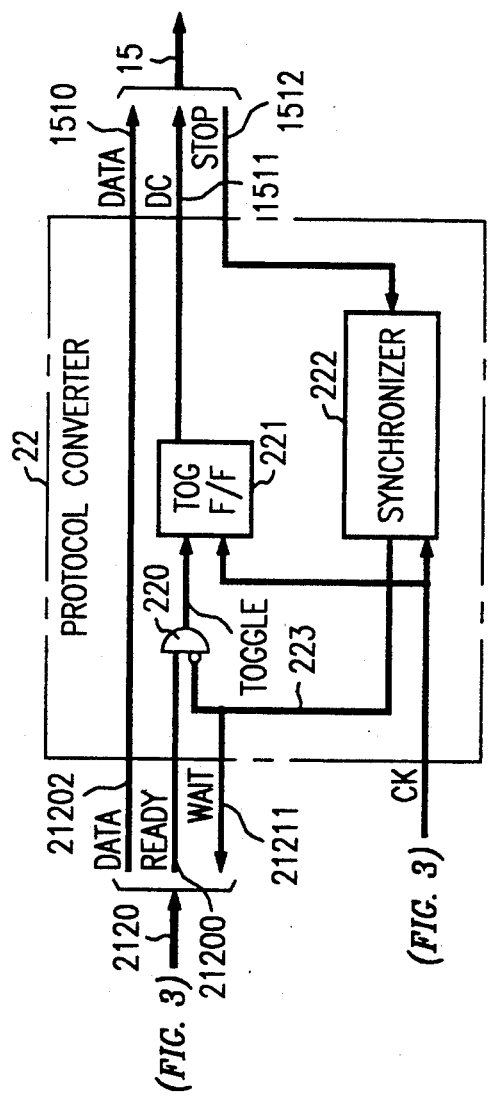

BUFFER CONTROL

COMMUNICATION NETWORK NODE

This application is a continuation of application Ser. No. 07/537,739, filed on Jun. 14, 1990, now abandoned.

TECHNICAL FIELD

The invention relates to a node for use with communication networks to exchange data between data systems coupled with a communication network.

BACKGROUND AND PROBLEM

Communication networks interconnect data systems so that the data systems may exchange data. Typically, a communication network, hereinafter called network, has transmission paths interconnecting nodes each coupled to data systems and each arranged to write data generated by an originating data system onto the network transmission paths and to read the data off the network transmission paths to a destination data system.

Nodes used with asynchronous networks operate to receive data at an incoming transmission rate from a preceding network node and to transmit data to a subsequent network node at an outgoing transmission rate independent of the incoming transmission rate. Asynchronous network nodes also receive data from data systems coupled with the node and transmit data thereto at transmission rates that may differ from the both the incoming and outgoing transmission rates.

Nodes used with synchronous networks operate to receive clocked incoming data at a constant transmission rate from a preceding network node and to transmit clocked data at an outgoing transmission rate synchronous with the incoming transmission rate to a subsequent network node. Synchronous network nodes also receive clocked data from data systems coupled with the node and transmit clocked data thereto at transmission rates synchronous with both the incoming and outgoing transmission rates.

A problem arises within asynchronous networks in that data systems which could be interconnected by an asynchronous network oftentimes require that clocked data be transmitted to the asynchronous network and received therefrom. Another problem arises with synchronous networks in that a master clock is required to synchronize operation of all the synchronous network nodes to insure that all transmission paths and nodes serving data systems connected thereto transmit and receive data at synchronous transmission rates.

SOLUTION

The foregoing problems are solved and communication networks are substantially enhanced by a node and method of operating a node having pulse controlled components intended for use with asynchronous and synchronous communication networks to interconnect data systems with transmission paths of the networks interconnecting network nodes. The node comprises clock apparatus for generating clock pulses and interconnects the pulse controlled node components connected with the clock apparatus with network transmission paths incoming to and outgoing from the node. The apparatus synchronizes a flow of data on an incoming transmission path within the node at a pulse rate of the generated clock pulses independent of a data transfer rate on the data flow on both the incoming and outgoing transmission paths.

The node apparatus comprises buffer store and control apparatus controlled by a flow of data on incoming transmission paths for receiving and storing bytes of data incoming from a preceding network node at a first data transfer rate. An unsynchronized node clock generates pulses at a pulse rate independent of the incoming data transfer rate such that apparatus coupled with the buffer store and control apparatus and the node clock are controlled by the generated clock pulses to unload ones of the received and stored data bytes from the buffer store apparatus into the node clock controlled components. Ones of the node clock controlled components transmits unloaded data bytes addressed to a data system interconnected with the node to a node processor coupled with the addressed data system at the pulse rate of the generated clock pulses. Other ones of the node clock controlled components store other unloaded data bytes and data bytes generated by a data system interconnected with the node at the generated clock pulse rate and selectively outpulse the stored data bytes to a succeeding network node on outgoing transmission paths at a second data transfer rate independent of both the generated clock pulse and first data transfer rate.

Node apparatus coupled with the succeeding network node responds to an overload signal generated by the succeeding network node by inhibiting outpulsing of data bytes to the succeeding network node. Other node apparatus coupled with the buffer store and with the preceding node prevents a node overload by responding to a predetermined number of incoming bytes stored in the buffer store to inhibit the preceding node from outpulsing additional data bytes on the incoming transmission line.

BRIEF DESCRIPTION OF THE DRAWING

FIG. 3 is a block diagram of the ring access control apparatus set forth in the network node of FIG. 1.

FIG. 4 illustrates details of the protocol converter apparatus set forth in the network node of FIG. 1, FIG. 5 sets forth the manner in which FIGS. 5A and 5B should be arranged.

Figure 5A:
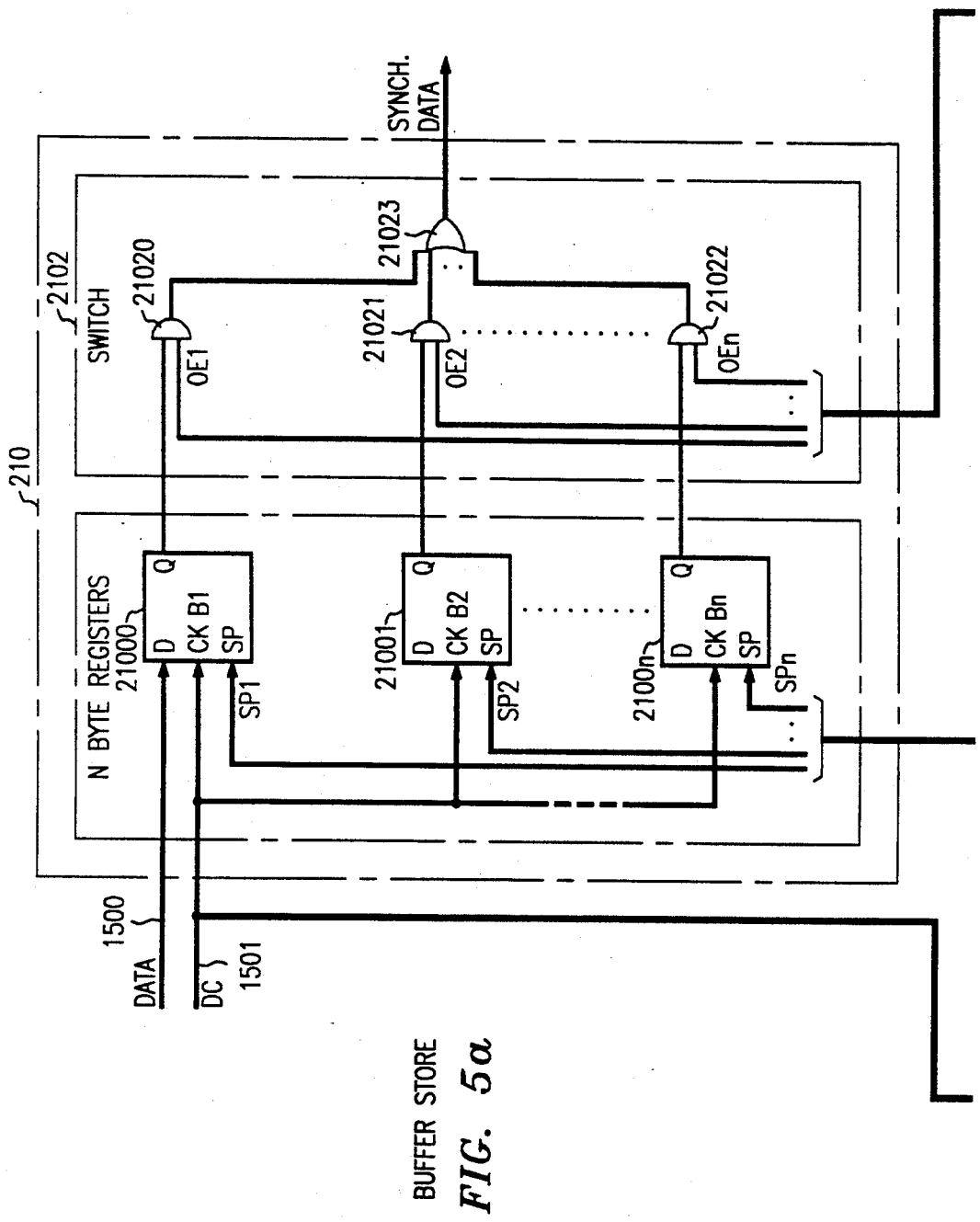
FIGS. 5A and 5B are block diagrams of the circuitry of the asynchronous clock protocol converter node apparatus set forth in FIGS. 1 and 2.
Figure 5B:
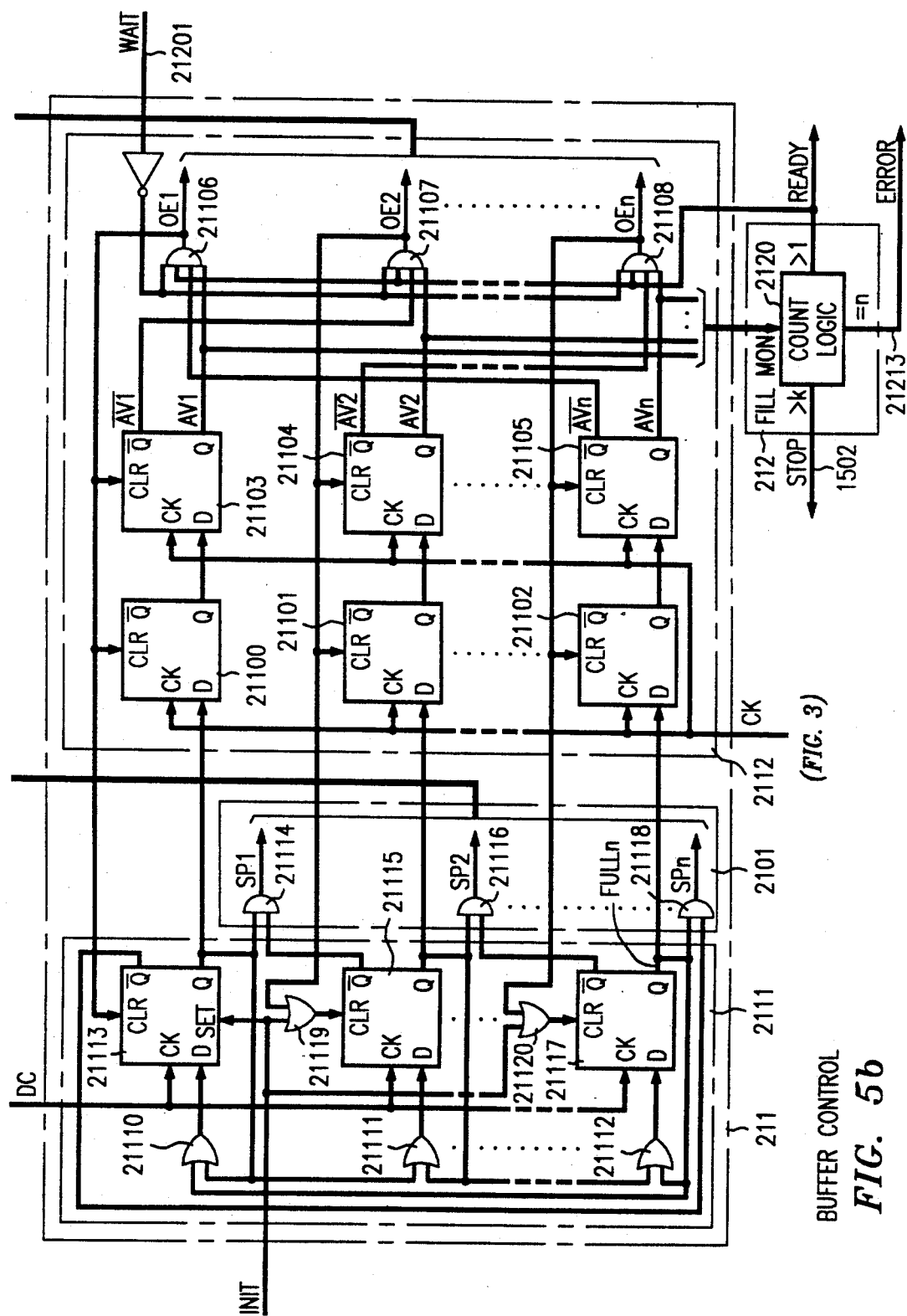

The detailed logic circuitry of the network set forth in FIGS. 5A and 5B of the drawing is performed by logic gates and registers, the operation of which is well-known in the art. Details of similar gates and registers are described by J. Millman and H. Taub in the textbook "Pulse, Digital and Switching Waveforms," 1965, McGraw-Hill, Inc., and in "The TTL Data Handbook for Design Engineers," second edition, 1976, Texas Instruments Incorporated.

DETAILED DESCRIPTION

Figure 1:
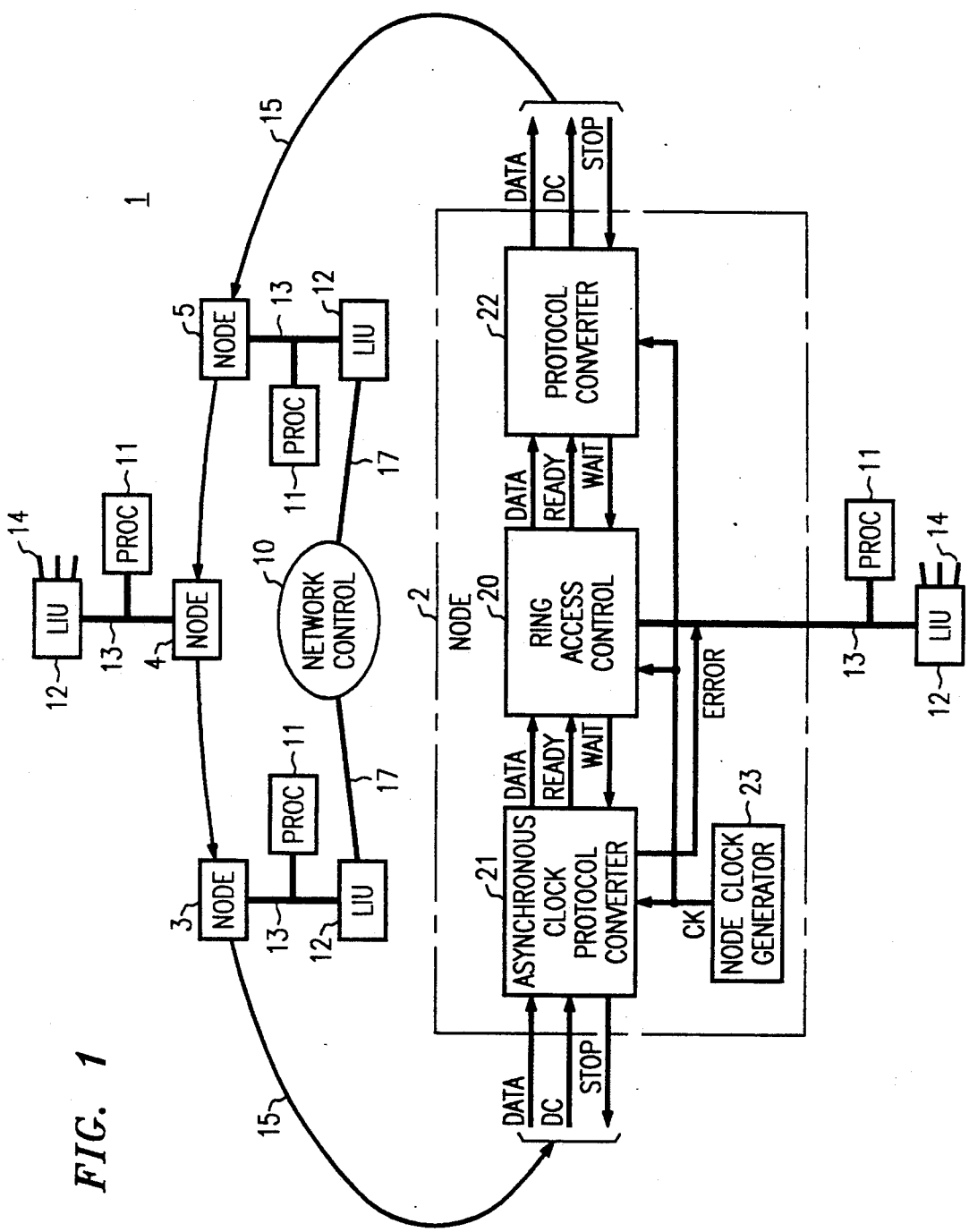
FIG. 1 is a block diagram of a network and network node embodying the principles of the invention.

Network 1 of FIG. 1 may be a type of asynchronous network as disclosed by M. L. Blood et al. in U.S. Pat. No. 4,554,659 issued on Nov. 19, 1985, or by D. M. Rouse et al. in U.S. Pat. No. 4,683,563 issued on Jul. 28, 1987. Network 1 has a number of nodes 2 through 5 interconnected by directional transmission paths, such as directional transmission path 15, to form a ring of nodes 2 through 5 wherein ones of the nodes are intended to couple data systems to network 1 in order that data may be selectively exchanged between the data systems. A node 2 and 4 may be connected by a data bus 13 with a node processor 11 and line interface unit 12 arranged to terminate data links 14 used to couple data systems with network 1. Nodes 3 and 5 may interconnect ring network control 10 with network 1. Ring network control 10 is coupled by data buses 17 with node line interface units 12 and node processors 11 of nodes 3 and 5.

In operation, a data system originates data and transmits the data over data link 14, through line interface unit 12 and data bus 13 to a node processor 11. Node processor 11 formats the received data into a data message having a format similar to the message format disclosed by the aforementioned U.S. Pat. Nos. 4,554,659 and 4,683,563. The data message is subsequently transmitted over data bus 13 to an originating node, such as node 4, and written onto a directional transmission path 15. The data message is transmitted to a destination node such as node 2. Destination node 2 reads the data message off transmission path 15 onto data bus 13 and into node processor 11. Data of the received data message is subsequently transmitted via data bus 13, through line interface unit 12 and over data link 14 to the receiving data system. Network 1 may transmit the data message over transmission path 15 from an originating node to a destination node through intermediate nodes or may transmit from one network sector through a node 3, data buses 17, ring network control 10, and another node 5 to a different network sector wherein is located the destination node.

The present embodiment of the invention assumes that each network node 3 through 5 may be similar to an asynchronous node of the type disclosed by the aforementioned Blood and Rouse patents. However, it is to be understood that in another embodiment of the invention, each network node 2 through 5 may be identical in both performance and structure to other network nodes and that only one node 2 need be described for an understanding of the invention. Thus, node 2, embodying the principles of the instant invention, can be used with asynchronous nodes in an asynchronous type of communication network or could be interconnected with other nodes 2 to form a synchronous communication network which would operate without the need for a master distributed network clock.

Figure 2:
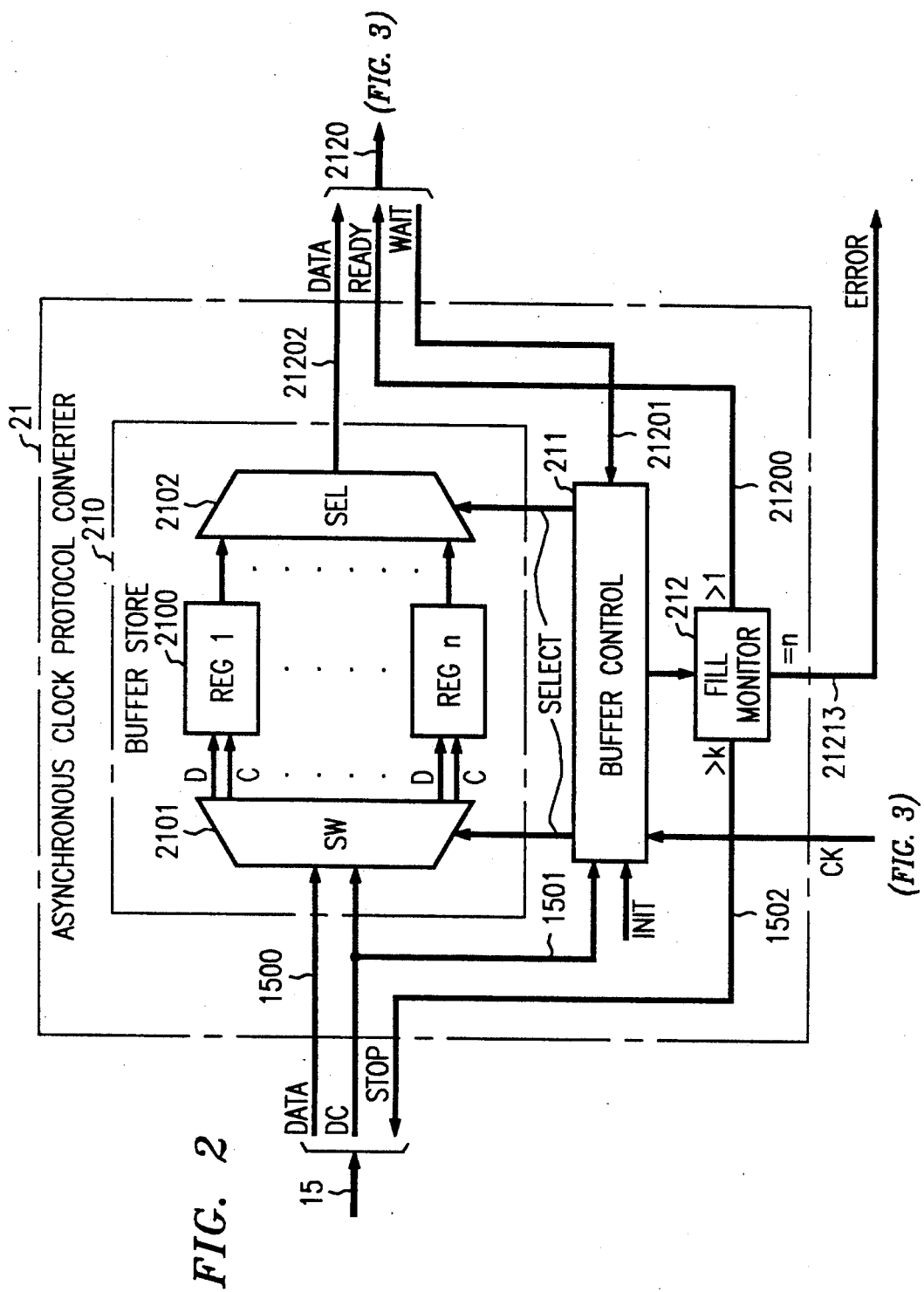
FIG. 2 illustrates details of the asynchronous clock protocol converter apparatus set forth in the network node of FIG. 1.

Transmission path 15, interconnecting nodes 2 through 5, FIG. 2, consists of data leads 1500, a data clock lead 1501, and a stop lead 1502. The number of data leads 1500 may vary depending on the format of the data handled by network 1. In one embodiment of the invention, successive bytes of data each consisting of 8 information bytes may be transmitted and received by each network node 2 through 5. Thus, data leads 1500 would consist of 10 leads comprising 8 data leads, a control bit lead and a parity lead wherein 8 bits of information comprising a data byte is sent over transmission path 15 between network nodes. Data, data clock, and stop leads 1500, 1501, 1502 incoming to node 2 are interconnected with asynchronous clock protocol converter 21 which serves to interconnect clock controlled components of node 2 with incoming transmission path 15.

Asynchronous clock protocol converter 21 has a buffer store 210 which includes a switch 2101 operating under control of buffer control 211 for selectively interconnecting data and data clock leads 1500, 1501 with buffer store registers 2100. Buffer store register 210 comprises a predetermined number of registers 2100 each intended to receive and store a byte of data incoming to node 2 on transmission path 15 in accordance with a data transfer rate determined by data clock lead 1501. Switch 2102, under control of buffer control 211 and node clock 207, FIG. 3, selectively interconnects ones of buffer stores registers 2100 with pulse controlled components of ring access control 20.

Data path 2120, FIG. 2, outgoing from asynchronous clock protocol converter 21, comprises data leads 21202, ready lead 21200, and wait lead 21201 and is selectively interconnected via switch 200, FIG. 3, with store 201. The output of store 201 is selectively connected via switch 202 with read store 203 and protocol converter 22, FIG. 4, which in turn has an output coupled with outgoing transmission path 15 comprising data, data clock, and stop leads 1510, 1511, 1512. Data path 2120, FIG. 3, in addition to being coupled with switch 200, is also coupled with token control 205 and ring control 204 which controls operation of ring access control switches 200, 202. Write store 206, ring control 204, and read store 203 are coupled with bus 13, FIG. 1, which in turn is coupled with node processor 11 and line interface unit 12. Write store 206, FIG. 3, has an output coupled with switch 200, FIG. 1, such that data originated by node processor 11 and data systems coupled with data links 14 of line interface unit 12 may be written onto outgoing transmission path 15 extending to network node 5. Ring access control 20, FIG. 3, also includes a node unsynchronized internal clock 207 which may generate clock pulses at a pulse repetition rate less than, equal to, or greater than the data transfer rate between network nodes.

In operation, FIG. 1, a first byte of a data message transmitted from node 3 to node 2 appears at the input of node 2 on incoming transmission path 15 coupled with asynchronous clock protocol converter 21. Node 3, in transmitting the data byte to node 2, places a signal on data clock lead 1501, FIG. 2, that enables buffer control 211 and switch 2101 to store the incoming data byte in a register 2100 of buffer store 210. Each succeeding byte of the incoming data is received and stored in a register 2100 of buffer store 210 at a data transfer rate determined by the signals placed on data clock lead 1501.

In the normal mode of operation, data path 2120 extends from the output of asynchronous clock protocol converter 21 to switch 200, FIG. 3, token control 205, and ring control 204. Ring access control switch 200 is initially set so that data path 2120 is coupled to the input of store 201. When a first byte of data has been received and stored in buffer store 210, FIG. 2, fill monitor 212 places a ready signal on ready lead 21200, FIG. 3, as an indication to store 201, token control 205, and ring control 204 that a data byte is available at the output of buffer store 210. The next clock pulse generated by node clock 207, FIG. 2, enables buffer control 211 via lead CK to control switch 2102 to connect a buffer store register 2100 with data path 2120. The clock pulse also enables the data byte to be stored in store 201, FIG. 3, token control 205, and ring control 204.

A token message continuously circles network 1, FIG. 1, on transmission path 15. Receipt of the token message at a node enables a node to write data received from a data system served by the node onto network transmission path 15. Node processor 11 receives data to be read onto network 1 from a data system served by the node, via data bus 13 and interface unit 12, over data link 14. The received data system data is formatted by node processor 11 and read into write store 206, FIG. 3, via data buses 13 and 20613. In the event that the data byte received by token control 205 is a token message, token control 205 enables ring control 204 to direct switch 200 to connect the output of write store 206 with the input of store 201 and to inform node processor 11 via buses 20413, 13 that node 2 may write data onto network 1. Node clock 207 enables write store 206 to write bytes of the data system data stored therein into store 201.

Store 201 may be a type of store similar to a first-in, first-out store wherein the first byte of data received by store 201 is the first byte of data to be read out onto an outgoing transmission path 15. Each received byte of data is moved by the application of a node clock generated clock pulse through the store positions of store 201 and appears at the output thereof which is coupled via switch 202 with outgoing data path 2120. Thus, the first byte of data read from write store 206 is read into and moved through store 201 and finally appears at the output thereof.

In the initial state of node 2, the output of store 201 is connected by switch 202 via data path 2120 and protocol converter 22, FIG. 4, with outgoing transmission path 15. Thus, a byte of data at the output of store 201 appears on data leads 1510 of transmission path 15 and store 201, FIG. 3, applies a ready signal over a ready lead 21200 to an input of logic gate 220, FIG. 4, of protocol converter 22. In the absence of a stop signal from succeeding node 5, logic gate 220 applies an enable signal to the input of logic circuit 221. The next clock pulse generated by node clock 207 enables logic circuit 221 to place a signal on data clock lead 1511 thereby notifying succeeding node 5 that the data byte appearing on outgoing transmission path 15 is available to be transmitted to node 5. During the time that write store 206, FIG. 3, is writing bytes of data into store 201, a wait signal is returned over wait lead 21201 of data path 2120 by ring control 204 to buffer control 211, FIG. 2. The wait signal inhibits reading of bytes of data from buffer store 210 onto data path 2120. When buffer store registers 2100 are filled with data bytes incoming from node 3, fill monitor 212 applies a stop signal to stop lead 1502 extending to preceding node 3. A signal appearing on a stop lead, such as stop lead 1512, FIG. 4, extending from succeeding node 5 to preceding node 2, enables logic circuit synchronizer 222 of protocol converter 22 of preceding node 3 to respond to a clock pulse by inhibiting logic gate 220 from operating logic circuit 221 to place a signal on data clock lead 1511. Thus, when buffer store 210, FIG. 2, is full, preceding node 3 is inhibited from transmitting bytes of data to node 2.

After write store 206, FIG. 3, has finished writing data onto outgoing transmission path 15, node processor 11 enables ring control 204, via buses 13, 20413, to set switch 200 to couple the output of buffer store 210, FIG. 2, with store 201. The token message stored in a register 2100 is then clocked out of buffer store 210 through switch 2102, over data path 2120 and switch 200, FIG. 3, into store 201. Node clock 207 clocks the token message through store 201 at the clock pulse rate until the token message appears at the output of store 201. If succeeding node 5 is ready to receive the next byte of data present at the output of store 201, as evidenced by the absence of a signal on stop lead 1512, FIG. 4, synchronizer 222 places an inverted binary zero signal on an input of logic gate 220 in response to a clock pulse. A ready signal appearing at the output of store 210 in response to the token message data byte enables logic gate 220 to set logic circuit 221. The next clock pulse generated by node clock 207 results in a signal being applied to data clock lead 1511. Thus, bytes of the token message are taken from node 2 by node 5 at the pulse rate determined by protocol converter 22.

During the interval of time that the token message is being clocked through the pulse controlled components of ring access control 20, FIG. 3, at the pulse rate determined by node clock 207, bytes of another data message are being received and stored in asynchronous clock protocol converter 21, FIG. 2, at the data transfer rate determined by signals appearing on data clock lead 1501. If the incoming data message is addressed to data systems served by another anode, ring control 204, FIG. 3, maintains switches 200, 202 set so that buffer store 210 is connected, via switch 200, with store 201 which in turn is coupled by switch 202 with outgoing transmission path 15. Each byte of the incoming data is received and stored in a register 2100, FIG. 2, of buffer store 210 at the data transfer rate determined by signals on data clock lead 1501. Each byte of incoming data, in the order received, is clocked out of buffer store registers 2100 through switch 2102, data path 2120, and switch 200, FIG. 3, into store 201 at the pulse rate of node clock 207. Node clock 207 clocks the bytes of data through store 201 which in turn applies a signal on the ready lead input to logic gate 220, FIG. 4. Each byte of the incoming data message appearing at the output of store 201 on outgoing transmission path 15 is taken by node 5 at a data transfer rate determined by signals appearing on data clock lead 1511.

When an incoming data message is addressed to a data system served by node 2, buffer control 211, FIG. 2, operates under control of data clock lead 1501 to control switch 2101 to record each byte of data in a buffer store register 2100. The data bytes, comprising the header portion of the incoming data message, are unloaded from buffer store 210, via switch 2102 and data path 2120, at the pulse rate determined by node clock 207, FIG. 3, concurrently into store 201, token control 205, and ring control 204. Ring control 204 determines from the header portion of the incoming data message that the message is addressed to a data system served by node 2. Accordingly, ring control 204 notifies node processor 11, via buses 20413, 13, that the incoming message is addressed to a data system served by node 2. When the first data byte of the incoming message appears at the output of store 201, FIG. 3, a C-bit located in the first byte of the data message enables ring control 204 via lead 2014 to set switch 202 to connect the output of store 201 with the input of read store 203. Each byte of the incoming data message appearing at the output of store 201 is then clocked at the pulse rate of node clock 207 into read store 203 via switch 202. The data bytes are clocked through read store 203 and over buses 20313, 13 into node processor 11, FIG. 1. The received message is reformatted by node processor 11 into a format required by the addressed data system and transmitted over bus 13, line interface unit 12, and data link 14 to the appropriate data system. The last data byte of the message contains end of message information which enables ring control 204, FIG. 3, to reset switch 202 to connect the output of store 201 via protocol converter 22 with outgoing transmission path 15.

Buffer store 210, FIGS. 5A and 5B, arranged as set forth by FIG. 5, comprises a predetermined number of byte registers 21000 through 2100n wherein each register is arranged to concurrently receive and store 10 bits of information comprising a byte of 8 bits of data and 2 bits of control information. The number of registers depend upon the difference of the data transfer rate of the data incoming on incoming transmission path 15 and the pulse rate of node clock 207, FIG. 3. The 10 data leads 1500, FIG. 2, of incoming transmission path 15 are each connected to all registers 21000 through 2100n.

In the initial idle state, logic circuits 21113, 21115, 21117 of buffer control 211 each having a binary zero and one appearing at outputs $\overline{Q}$ and Q, respectively. During the initialization sequence, node processor 11, FIG. 1, applies an initialization signal via bus 13 to buffer control lead INIT, FIGS. 5A and 5B. The initialization signal sets logic circuit 21113 so that a binary zero and one is maintained at outputs $\overline{Q}$ and Q, respectively. The initialization signal is also applied to OR gates 21119 through 21120 to clear other logic circuits, such as logic circuits 21115 through 21117, so that a binary one and zero appears at outputs $\overline{Q}$ and Q. With both inputs one, AND gate 21114, enables select lead SP1 extending to first register 21000 of buffer store 210. When preceding node 3 places a first byte of data on data leads 1500 of transmission path 15 incoming to node 2, a subsequent signal appearing on data clock lead 1501 from node 3 enables the first register 21000 to receive and store the first byte of incoming data.

Since a binary one appears at an input of OR gate 21111, the data clock lead 1501 signal controls logic circuit 21115 to place a binary zero and one on outputs $\overline{Q}$ and Q, respectively. The binary zero appearing on the input of AND gate 21114 inhibits select lead SP1 following the storing of the first byte of data in register 21000. AND gate 21116, corresponding with logic circuits 21115, 21117 and connected with the Q and $\overline{Q}$ terminals, respectively, responds to the binary one signal appearing on both inputs by enabling select lead SP2 extending to buffer store register 21001.

Unsynchronized node clock 207, FIG. 3, is connected with and controls the operation of the pulse controlled components of node 2 at a pulse rate which is determined by the repetition rate of the pulses generated by node clock 207 independent of the data transfer rate of the data incoming on transmission path 15 from node 3. When the first byte of incoming data, FIG. 2, has been received and stored in register 21000, logic circuit 21115, FIGS. 5A and 5B, is set to apply a binary one to an input of logic circuit 21101. Following initialization and the receipt of the first byte of incoming data, a first clock pulse generated by node clock 207 and applied to the clock input of logic circuits 21100, 21101, 21102 sets logic circuits 21100 and 21101 to apply a binary one to an input of a corresponding logic circuits 21103 and 21104 and logic circuit 21102 to apply a binary zero to an input of logic circuit 21105.

The second byte of data appearing on data leads 1500 is followed by a signal on data clock 1501 which controls buffer store register 21001 to receive and store the second data byte. The data clock lead signal also controls logic circuit 21117 to place a binary zero and one, respectively, on outputs $\overline{Q}$ and Q thereby enabling AND gate 21116 connected therewith to inhibit select lead SP2 extending to the buffer store register 21001.

The same signal also sets the next succeeding logic circuit to place a binary one and zero on outs $\overline{Q}$ and Q thereby enabling an AND gate connected thereto to enable the select lead extending to the next buffer store register. Thus, buffer control 211, FIG. 2, operating under control of signals applied by node 3 to data clock lead 1501, enables buffer store 210 to receive and store data bytes appearing on incoming transmission path 15 within registers 2100 of buffer store 210 at the data rate determined by the signals on data clock lead 1501.

A pulse controlled node component, FIG. 3, coupled with asynchronous clock protocol converter 21 and ready to take a byte of data, places a binary zero signal on wait lead 21201 extending to buffer control 211, FIG. 2. The binary zero signal appearing on wait lead 21201, FIGS. 5A and 5B, is converted into a binary one signal and applied to an input of AND gates 21106, 21107, and 21108. In addition, fill monitor 2120, via READY lead, applies a binary one signal to an input of AND gates 21106, 21107, and 21108. Since logic circuit 21103 has a binary zero and one appearing at outputs $\overline{Q}$ and Q, respectively, a binary one is applied via lead AV1 to another input of AND gate 21106. The next clock pulse applied to the clock input of logic circuit 21105 sets logic circuit 21105 to place a binary one and zero on outputs $\overline{Q}$ and Q, respectively.

The binary 1 appearing on leads AV1 and $\overline{AVn}$, in combination with the signals appearing on wait lead 21201 and READY lead, enable AND gate 21106 to place a binary one signal on lead OE1 which enables AND gate 21020 of switch 2102, FIG. 2, so that the appropriate pulse controlled component may take the byte of data stored in buffer store register 21000, FIGS. 5A and 5B. When the byte of data has been taken, the receiving pulse controlled node component removes the binary signal from wait lead 21201 thereby inhibiting operation of AND gates 21106, 21107, 21108. The binary one signal that appeared on lead OE1 also clears logic circuits 21113, 21100, and 21103 to place a binary one and zero on the respective $\overline{Q}$ and Q outputs thereby indicating that a byte of data received from node 3 and stored in register 21000 buffer store 210 has been transmitted to a pulse controlled node component and register 21000 is ready to receive another byte of data from node 3. Cleared logic circuit 21103 applies a binary one to AND gate 21107 and the pulse controlled node component coupled with buffer store 210 applies a binary zero to wait lead 21201 when ready to receive the next byte of data from buffer store 210.

Buffer control, FIG. 2, functions to receive and sequentially store each byte of incoming data in buffer store register at the data transfer rate determined by signals applied to the data clock lead incoming from preceding node 3. Stored bytes of data are clocked out of buffer store 210 on data path 2120 into ones of the pulse controlled node components at the pulse rate determined by the rate of the pulses generated by node clock 207, FIG. 3. Thus, the incoming data bytes are sequentially received and stored in succeeding registers of buffer store 210, FIG. 2. Stored ones of the data bytes are unloaded from the buffer store registers such that the first data byte stored in buffer store 210 is the first byte of data taken by the pulse controlled components of node 2.

Each byte of incoming data continues to be stored in a succeeding register of buffer store 210 even though earlier received and stored data bytes are being unloaded by node clock 207. As each stored byte of data is unloaded from a buffer store register, for example register 21000, the logic circuits 21113, 21100, 21103 are cleared by lead OE1. If, for example, there are assumed to be four buffer store registers, each incoming byte of data would be received and stored in registers 1 through 4. Prior to receipt and storage of the fourth byte of data, select lead SPn, assumed to be associated with the fourth register of buffer store 210, would have a binary one applied thereto to enable the appropriate buffer store register. OR gate 21112 connected with an input of logic circuit 21117 assumed to be the logic circuit associated with the last buffer store register 2100n and having a binary one applied to an input by a preceding logic circuit, responds to a signal on data clock lead 1501 by setting logic circuit 21117 so that a binary zero and one appears on output terminals $\overline{Q}$ and Q, respectively.

Assuming that the bytes of data previously stored in buffer store register 21000 has been unloaded, logic circuit 21113 has been cleared so that a binary one and zero appear at the $\overline{Q}$ and Q outputs, respectively. When a signal appears of the data clock lead 1501, the fourth byte of incoming data is received and stored in fourth buffer store register 2100n and logic circuit 21113 is set so that a binary zero and one appears at the $\overline{Q}$ and Q outputs. The binary zero appearing at the $\overline{Q}$ output of logic circuit 21113 controls AND gate 21118 to inhibit select lead SPn. The binary one appearing at output $\overline{Q}$ of cleared logic circuit 21115, in combination with the binary one appearing on the Q output of logic circuit 21113, control AND gate 21114 to enable select lead SP1 extending to the first byte register 21000. As bytes of data are unloaded from buffer store 210, succeeding bytes of incoming data are sequentially stored in the registers of buffer store 210. When the last buffer store register is filled, the next incoming byte of data is received and stored in the first register assuming the byte of data previously stored therein was unloaded into the pulse controlled components of node 2.

Counter logic 2120 of fill monitor 212 is also used to determine the full content of buffer store 210 and prevent an overflow. The present embodiment of the invention assumes that when a predetermined number, k, of incoming bytes of data have been stored in buffer store 210 as indicated by binary one signals appearing on ones of the AV leads, buffer store 210 is approaching the overflow state. Accordingly, counter logic 2120 enables stop lead 1502, FIG. 1, extending to preceding node 3. The enabled stop lead 1502 controls protocol converter 22 of preceding node 3 to inhibit data clock lead until node 2 has unloaded additional bytes of data stored in buffer store 210. Counter logic 2120 of fill monitor 212, FIG. 2, also generates an error signal on lead 21213 which functions to inform node processor 11, via bus 13, that an error overflow condition has occurred in asynchronous clock protocol converter 21.

In the operation of node 2, FIG. 2, buffer store 210 and buffer control 211 interconnect pulse controlled components of node 2 with an incoming network transmission path 15 and synchronizes a flow of data incoming on transmission path 15 within the node at an internal clock pulse rate independent of the data transfer rate of the incoming data flow. Buffer store 210 and buffer control 211 are controlled by the incoming flow of data for receiving and storing data bytes incoming from preceding network node 3 at a data transfer rate between nodes 3 and 2.

Internal clock 207 of node 2, FIG. 3, generates unsynchronized pulses at a pulse rate independent of the data transfer rate unload apparatus 2112, FIGS. 5A and 5B, coupled with buffer store 210 means and node clock 207. Pulses generated by node clock 207 unloads ones of the received and stored data bytes from buffer store 210 into ones of the pulse controlled node components. When an incoming data message is addressed to a data system interconnected with node 2, pulse controlled node components, coupled with node clock 207 and controlled by the clock pulses, transmit unloaded stored data bytes of the data message to node processor 11 at the pulse rate of the generated clock pulses. Write store 206, FIG. 3, coupled with node clock 207 and controlled by node clock generated clock pulses, selectively outpulse ones of data bytes generated by a data system interconnected with node 2 to store 201 wherein the data bytes are outpulsed to a succeeding network node 5 on an outgoing one of the transmission paths 15 at a data transfer rate determined by node 5.

Node 2 protocol converter 22, coupled by outgoing transmission path 15 with a succeeding network node 5, is responsive to an overload signal generated by network node 5 for inhibiting the outpulsing of data bytes to network node 5 when the data bytes stored in a buffer store 210 or other type of data store of node 5 exceeds a predetermined number of data bytes. Counter logic 2120, FIG. 2, of fill monitor 212, coupled with buffer control 211 and preceding node 3, responds to a predetermined number of incoming data bytes stored in buffer store 210 by inhibiting preceding node 3 from outpulsing data bytes intended for node 2 on transmission path 15.

We claim:

1. A node having pulse controlled components for use with communication networks to interconnect data systems with asynchronous and synchronous network transmission paths interconnecting network nodes comprising means interconnected with the node pulse controlled components for generating clock pulses to control data flow through the node pulse controlled components, and means coupled with ones of the network transmission paths incoming to and outgoing from the node and with the pulse controlled components for interconnecting ones of the node pulse controlled components connected with said clock pulse generating means with said ones of the network transmission paths and controlled by said generated clock pulses for synchronizing network transmission path asynchronous and synchronous data flow incoming to and outgoing from the node within the node at a repetition rate of said generated clock pulses independent of data transfer rates of the incoming and outgoing network transmission path asynchronous and synchronous data flow.

2. The node set forth in claim 1 wherein said interconnecting and synchronizing means comprise means controlled by a flow of data on an incoming transmission path for receiving and storing bytes of the data incoming from a preceding network node at a first data transfer rate.

3. The node set forth in claim 3 wherein said clock pulse generating means comprise clock means for generating clock pulses at a pulse rate independent of said first data transfer rate.

4. The node set forth in claim 3 wherein said interconnecting and synchronizing means comprise means coupled with said receiving and storing means and with said clock means and controlled by said generated clock pulses for unloading ones of said received and stored data bytes from said receiving and storing means into ones of said node pulse controlled components.

5. The node set forth in claim 4 wherein said node pulse controlled components comprise means coupled with said clock means and controlled by said generated clock pulses for transmitting ones of the unloaded data bytes addressed to a data system interconnected with the node to a node processor coupled with the addressed data system at the pulse rate of said generated clock pulses.

6. The node set forth in claim 5 wherein said node components comprise means coupled with said clock means and controlled by said generated clock pulses for storing other ones of the unloaded data bytes and data bytes generated by a data system interconnected with the node at said generated clock pulse rate and for selectively outpulsing said stored data bytes to a succeeding network node on an outgoing transmission path at a second data transfer rate independent of said generated clock pulse rate and said first data transfer rate.

7. The node set forth in claim 6 wherein said interconnecting and synchronizing means comprise means coupled with said succeeding network node and responsive to an overload signal generated by said succeeding network node for inhibiting outpulsing of data bytes to said succeeding network node.

8. The node set forth in claim 7 wherein said interconnecting and synchronizing means comprise means coupled with said unloading means and said preceding node and responsive to a predetermined number of incoming data bytes stored in said data byte receiving and storing means for inhibiting said preceding node outpulsing data bytes on said incoming transmission line.

9. A node having pulse controlled components for use with asynchronous and synchronous communication networks to interconnect data systems with network transmission paths interconnecting network nodes comprising means controlled by a flow of data on a transmission path incoming to the node for receiving and storing bytes of said data incoming from a preceding network node at a first data transfer rate, clock means for generating clock pulses at a pulse rate independent of said first data transfer rate, means coupled with said receiving and storing means and with said clock means and controlled by said generated clock pulses for unloading ones of said received and stored data bytes from said receiving and storing means into ones of said node pulse controlled components, means coupled with said clock means and controlled by said generated clock pulses for transmitting ones of the unloaded data bytes addressed to a data system interconnected with the node to a node processor coupled with the addressed data system at said pulse rate of said generated clock pulses, means coupled with said clock means and controlled by said generated clock pulses for storing other ones of the unloaded data bytes and data bytes generated by a data system interconnected with the node at said generated clock pulse rate and for selectively outpulsing said stored data bytes to a succeeding network node on an outgoing transmission path at a second data transfer rate independent of said generated clock pulse rate and said first data transfer rate, means coupled with said succeeding network node and responsive to an overload signal generated by said succeeding network node for inhibiting outpulsing of data bytes to said succeeding network node, and means coupled with said unloading means and said preceding node and responsive to a predetermined number of incoming data bytes stored in said data byte receiving and storing means for inhibiting said preceding node outpulsing data bytes on said incoming transmission line.

10. A method of operating a node having pulse controlled components in communication networks used for interconnecting data systems wherein asynchronous and synchronous network transmission paths interconnect network nodes comprising the steps of generating clock pulses for controlling data flow through the node pulse controlled components, and interconnecting the node pulse controlled components with ones of the network transmission paths incoming to and outgoing from the node and synchronizing a flow of incoming and outgoing network transmission path asynchronous and synchronous data within the node at a pulse rate of said generated clock pulses independent of a data transfer rate of the asynchronous and synchronous data flow on both the incoming and outgoing transmission paths.

11. The node operating method set forth in claim 10 wherein said interconnecting and synchronizing step comprise the step of receiving and storing bytes of said data incoming from a preceding network node at a first data transfer rate controlled by a flow of data on a transmission path incoming to the node.

12. The node operating method set forth in claim 11 wherein said clock pulse generating step comprises the step of generating said clock pulses at a pulse rate independent of said first data transfer rate.

13. The node operating method set forth in claim 12 wherein said interconnecting and synchronizing step comprises the step of unloading ones of said received and stored data bytes from data byte receiving and storing apparatus into ones of said node clock pulse controlled components at a second data transfer rate determined by said generated clock pulse rate.

14. The node operating method set forth in claim 13 wherein said interconnecting and synchronizing step comprises the step of reading ones of the unloaded data bytes addressed to a data system interconnected with the node into a node processor coupled with the addressed data system at said second data transfer rate.

15. The node operating method set forth in claim 14 wherein said node interconnecting and synchronizing step comprises the step of storing other ones of the unloaded data bytes and data bytes generated by said data system interconnected with the node at said second data transfer rate and selectively outpulsing said stored data bytes to a succeeding network node on one of a transmission path outgoing from the node at a third data transfer rate independent of said first and second data transfer rates.

16. The node operating method set forth in claim 15 wherein said interconnecting and synchronizing step comprises the step of
inhibiting outpulsing of data bytes to said succeeding network node in response to an overload signal generated by said succeeding network node and sent to said node over said outgoing transmission path coupled with said succeeding node.

17. The node operating set forth in claim 16 wherein said interconnecting and synchronizing step comprises the step of
inhibiting a preceding node from outpulsing data bytes on said incoming transmission path upon determining that a predetermined number of incoming data bytes are currently stored in said node data byte receiving and storing apparatus.

18. A method of operating a node having pulse controlled components in asynchronous and synchronous communication networks used for interconnecting data systems wherein network transmission paths interconnect network nodes comprising the steps of
receiving and storing bytes of data incoming from a preceding node of a network in receiving and storing apparatus at a first data transfer rate,
generating clock pulses at a pulse rate independent of said first data transfer rate,
unloading ones of said received and stored data bytes from said receiving and storing apparatus into ones of said node pulse controlled components at a second data transfer rate determined by said generated clock pulse rate,
transmitting ones of the unloaded data bytes addressed to a data system interconnected with the node to a node processor coupled with the addressed data system at said second data transfer rate,
storing other ones of the unloaded data bytes and data bytes generated by a data system interconnected with the node at said second data transfer rate and selectively outpulsing said stored data bytes to a succeeding network node on ones of the transmission paths outgoing from said node at a third data transfer rate independent of said first and second data transfer rates,
inhibiting outpulsing of said unloaded data bytes and said generated data bytes to said succeeding network node in response to an overload signal generated by said succeeding network node, and
inhibiting said preceeding node outpulsing data bytes on a transmission line incoming to the node in response to a predetermined number of incoming data bytes stored in the node receiving and storing apparatus.

19. A node having pulse controlled components for use with communication networks to interconnect data systems with asynchronous network transmission paths interconnecting network nodes comprising
means interconnected with the node pulse controlled components for generating clock pulses to control data flow within the node through the pulse controlled components, and
means coupled with asynchronous network transmission paths incoming to and outgoing from the node and with the pulse controlled components for interconnecting ones of the node pulse controlled components connected with said clock pulse generating means with said node incoming and outgoing asynchronous transmission paths and controlled by said generated clock pulse for synchronizing asynchronous data flow incoming to and outgoing from the node on the asynchronous network transmission paths within the node at a repetition rate of said generated clock pulses independent of data transfer rates of the incoming and outgoing network transmission path asynchronous data flow.

20. A node having pulse controlled components for use with communication networks to interconnect data systems with asynchronous and synchronous network transmission paths interconnecting network nodes comprising
means interconnected with the node pulse controlled components for generating clock pulses at a pulse rate independent of transfer rates of data flow on the asynchronous and synchronous network transmission paths to control flow of bytes of data through the node pulse controlled components within the node, and
means coupled with ones of the network transmission paths incoming to and outgoing from the node and with the pulse controlled components for interconnecting ones of the node pulse controlled components connected with said clock pulse generating means with said ones of the network transmission paths and which are controlled by said generated clock pulses for synchronizing the flow of the network transmission path asynchronous and synchronous data bytes incoming to and outgoing from the node withinthe node at a repetition rate of said generated clock pulses independent of data transfer rates of the incoming and outgoing network transmission path asynchronous and synchronous data byte flow.

21. A method of operating a node having pulse controlled components in communication networks used for interconnecting data systems wherein asychronous and synchronous network transmission paths interconnect network nodes comprising the steps of
generating clock pulses at a pulse rate independent of transfer rates of data flow on asynchronous and synchronous network transmission paths incoming to and outgoing from the node to control flow of data within the node through the node pulse controlled components, and
interconnecting the node pulse controlled components with the incoming and outgoing network transmission paths and synchronizing the flow of incoming and outgoing network transmission path asynchronous and synchronous data within the node at the pulse rate of said generated clock pulses independent of the data transfer rates of the asynchronous and synchronous data flow on both the incoming and outgoing transmission paths.

* * * * *